United States Patent [19]

Summa

[11] 3,742,997

[45] July 3, 1973

[54] SNO-GO

[76] Inventor: Frank A. Summa, 22 Starbuck St., Staten Island, N.Y. 10204

[22] Filed: Apr. 5, 1971

[21] Appl. No.: 131,299

[52] U.S. Cl. .............................................. 152/233
[51] Int. Cl. ............................................ B60c 27/02
[58] Field of Search................... 152/233, 221, 222

[56] References Cited
UNITED STATES PATENTS 3,018,811  1/1962  Deponai........................... 152/233
2,453,426  11/1948  Freed................................ 152/233

Primary Examiner—James B. Marbert
Attorney—Allison C. Collard

[57] ABSTRACT

A device for providing excellent traction for an automotive vehicle upon ice or snow, the device consisting of a locking latch with pins for detatchably attaching together a pair of tire grips which at their opposite ends are attached together by means of chains, thereby permitting quick and easy installation of the device around the automobile tires.

1 Claim, 3 Drawing Figures

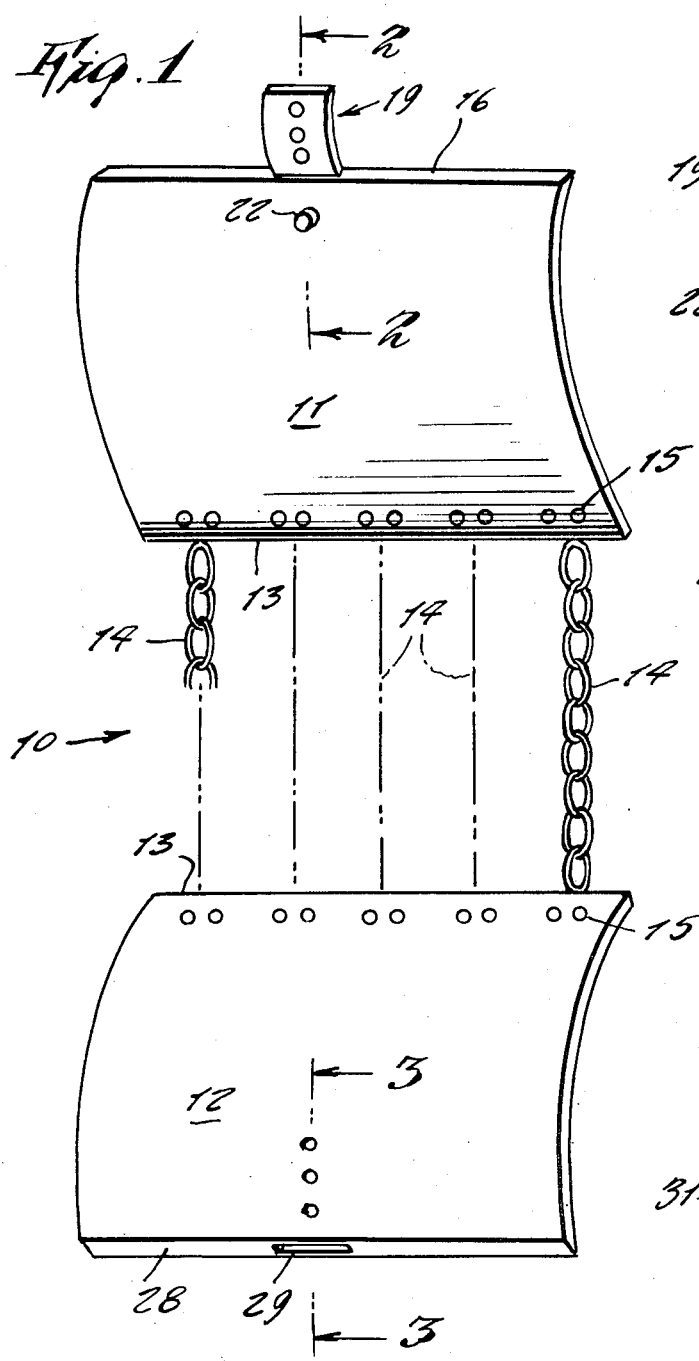
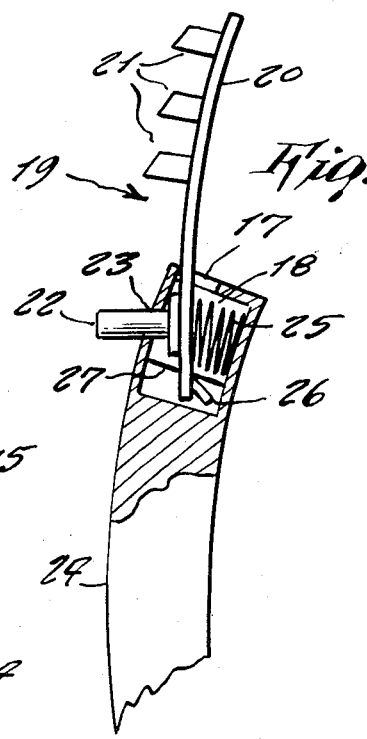
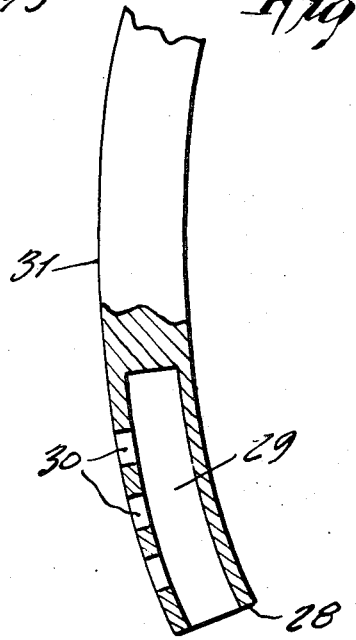
INVENTOR
FRANK A. SUMMA

SNO-GO

This invention relates generally to automotive vehicles. More specifically the present invention relates to automotives accessories. Still more specifically the present invention relates to snow and ice traction devices for automotive vehicles.

A principal object of the present invention is to provide an improved means of attaining traction for an automotive vehicle upon snow or ice and wherein the device can be more easily installed and taken off than would be possible by using conventional tire chains.

Yet another object of the present invention is to provide a traction device which does not require the automobile to be jacked up for installation around the automobile tires.

Still another object of the present invention is to provide a traction device which does not require spreaders, and which gives a better traction than snow tires thus enabling the vehicle to stop better on ice and snow.

Yet another object of the present invention is to provide a traction device which is readily adaptable for all type of automotive vehicles such as passenger cars, trucks, buses and the like.

Other objects of the present invention are to provide a sno-go traction device which is simple in design, inexpensive to manufacture, rugged in construction, easy to use and efficient in operation.

These and other objects will be readily evident upon a study of the following specification and drawing wherein:

FIG. 1 is an outside perspective view of the present invention,

FIG. 2 is an enlarged cross sectional view taken on the line 2—2 of FIG. 1,

FIG. 3 is an enlarged cross sectional view taken on the line 3—3 of FIG. 1.

Referring now to the drawing in detail, the reference numeral 10 represents a sno-go traction device for automotive vehicles, the traction device including a pair of tire grips 11 and 12 each of which consists of a curved plate for being positioned adjacent the outer side of an automobile tire. Each of the tire grips are secured along one edge 13 to one end of a plurality of chains 14 extending between the edges 13 of the tire grips, the chain ends being secured to the tire grips by means of rivets 15. The opposite end 16 of the tire grip 11 is provided with a slotted opening 17 in the edge thereof, the opening 17 communicating with a chamber 18 within the interior of the tire grip 11. One end of a locking latch assembly 19 is fitted through the opening 17 into the chamber 18, the locking latch assembly including an arcuate curved plate 20, the outwardly extending portion of the arcuate plate 20 having a plurality of three radially outward extending locking pins 21. The opposite end of the locking latch plate 20 has a release button 22 rigidly affixed there to, the release button 22 extending outwardly of an opening 23 extending through the convex side 24 of the tire grip 11. A compression coil spring 25 within the chamber 18 bares against the locking latch plate 20 so to urge the release button into the outwardly protruding position through the opening 23 of the tire grip.

At the terminal end of the locking latch plate 20 which extends into the chamber 18, there are intergally affixed there to a pair of sidewardly extending locking pins 26 which are adaptable to ride up and down within a slot 27 formed on opposite sides of the chamber 18 of the tire grip 11. The sidewardly extending pins 26 serve to prevent disengagment of the locking latch with the tire grip 11.

The other tire grip 12 upon its opposite edge 28 has a slotted opening 29 into which the locking latch plate 20 is receivable. A plurality of three openings 30 communicate between the opening 29 and the convex aside 31 of the tire grip 12 the openings 30 being adaptable for each receiving one of the locking pins 21 of the locking latch assembly 19.

Instead of using a conventional tire chains which necessiate the vehicle to be jacked up, the present invention can be installed while all the wheels are on the ground. A person marely places one tire grip on one side of the tire, and the other tire grip on the other side of the tire, thus allowing the chains to be on the road side of the tire; and then simply inserting the latch with the locking pins into the openings 30 provided on the tire grip 12. The latch will pass through the wheel opening and hub cap opening, so that the device when attached around the tire and wheel is fitted transversely there around. When it is desired to take the device off, a person simply presses the spring loaded release button 22, which allows the locking pins 21 to disengage with the locking pin openings 30 of the tire grip 12 so that the device releases its transverse hold around the tire and wheel.

It is to be noted that the latch may by made between two pieces of aluminum or tungsten or any equlivent light weight metal of good durability, or of alloys. Thus there is provided an improved means of traction for an automotive vehicle on snow or ice.

What I now claim is:

1. A traction device for a motor vehicle, comprising:
   a pair of curved plates, for disposal adjacent opposite lateral sides of a tire of the vehicle, for gripping the tire;
   a plurality of chains, affixed at their ends to one end of each of said curved plates, for joining said plates, said chains being disposed over the treads of the tire of the vehicle when said plates are disposed adjacent the sides thereof;
   a latch plate, movably disposed in a first recess provided in the other end of one of said curved plates and extending outwardly therefrom, and having a plurality of first locking pins disposed on the surface thereof on the portion of said latch plate extending from said recess, a release button affixed to the portion of said latch plate disposed within said recess and extending outwardly through the outer surface of said curved plate for moving said latch plate within said recess, and laterally, outwardly extending second locking pins disposed on the portion of said latch plate disposed within said recess for engaging a guide slot integrally formed with said recess and thereby guiding movement of said latch plate therein, said other curved plate having a second recess provided therein in the other end thereof for receiving said latch plate which includes a plurality of apertures disposed in said other curved plate for receiving said first locking pins, whereby said curved plates are joined at said other ends thereof by said latch plate and locking pins disposed in said second recess and said apertures, respectively; and
   a spring, disposed within said first recess and engaging said latch plate for biasing said latch plate outwardly with respect to said curved plate.

* * * * *